United States Patent [19]

Blatt et al.

[11] Patent Number: 5,135,276
[45] Date of Patent: Aug. 4, 1992

[54] TRANSFER BOOM

[75] Inventors: John A. Blatt, 22 Stratton Pl., Grosse Pointe Shores, Mich. 48236; David C. Tomlin, Mt. Clemens, Mich.

[73] Assignee: John A. Blatt, Grosse Pointe Shores, Mich.

[21] Appl. No.: 639,831

[22] Filed: Jan. 9, 1991

[51] Int. Cl.⁵ .................... B66C 1/02; B23Q 7/04
[52] U.S. Cl. ........................ 294/65; 138/111; 138/115; 212/221; 414/752
[58] Field of Search .............. 414/749–752, 414/591, 627, 676, 732, 737; 294/64.1, 64.2, 65, 81.54, 67.33; 138/111, 115, DIG.11; 212/221, 177

[56] References Cited

U.S. PATENT DOCUMENTS

| | | | |
|---|---|---|---|
| 1,792,576 | 2/1931 | Dryon | 294/65 |
| 2,893,088 | 8/1959 | Corbin | 294/65 |
| 3,104,085 | 9/1963 | Skladany | 108/51.1 |
| 3,280,530 | 10/1966 | Rothenbach | 138/111 |
| 3,318,068 | 5/1967 | Voullaire | 53/164 |
| 3,384,702 | 5/1968 | Stevens | 138/115 |
| 3,656,515 | 4/1972 | Wogerbauer et al. | 138/DIG. 11 |
| 3,885,678 | 5/1975 | Borg | 214/1 BB |
| 4,466,531 | 8/1984 | Baugher et al. | 414/752 |
| 4,650,234 | 3/1987 | Blatt | 294/65 |
| 4,946,335 | 8/1990 | King et al. | 294/65 |

*Primary Examiner*—Joseph F. Peters, Jr.
*Attorney, Agent, or Firm*—Basile and Hanlon

[57] ABSTRACT

A transfer boom adapted for suspension from a reciprocal shuttle carriage comprises a boom arm having a plurality of interior passages extending the length of the boom arm. These passages define air passages, thereby eliminating the need for exterior hoses. A T-shaped cavity is provided within the exterior walls of the boom arm. A boom mount, having Venturi cups or grippers is detachably mounted to the boom arm within the T-shaped cavity by a T-bolt. This enables the boom mount to be mounted anywhere along the length of the boom arm. The T-bolt provides for easy removability of the boom mount from the boom arm.

14 Claims, 3 Drawing Sheets

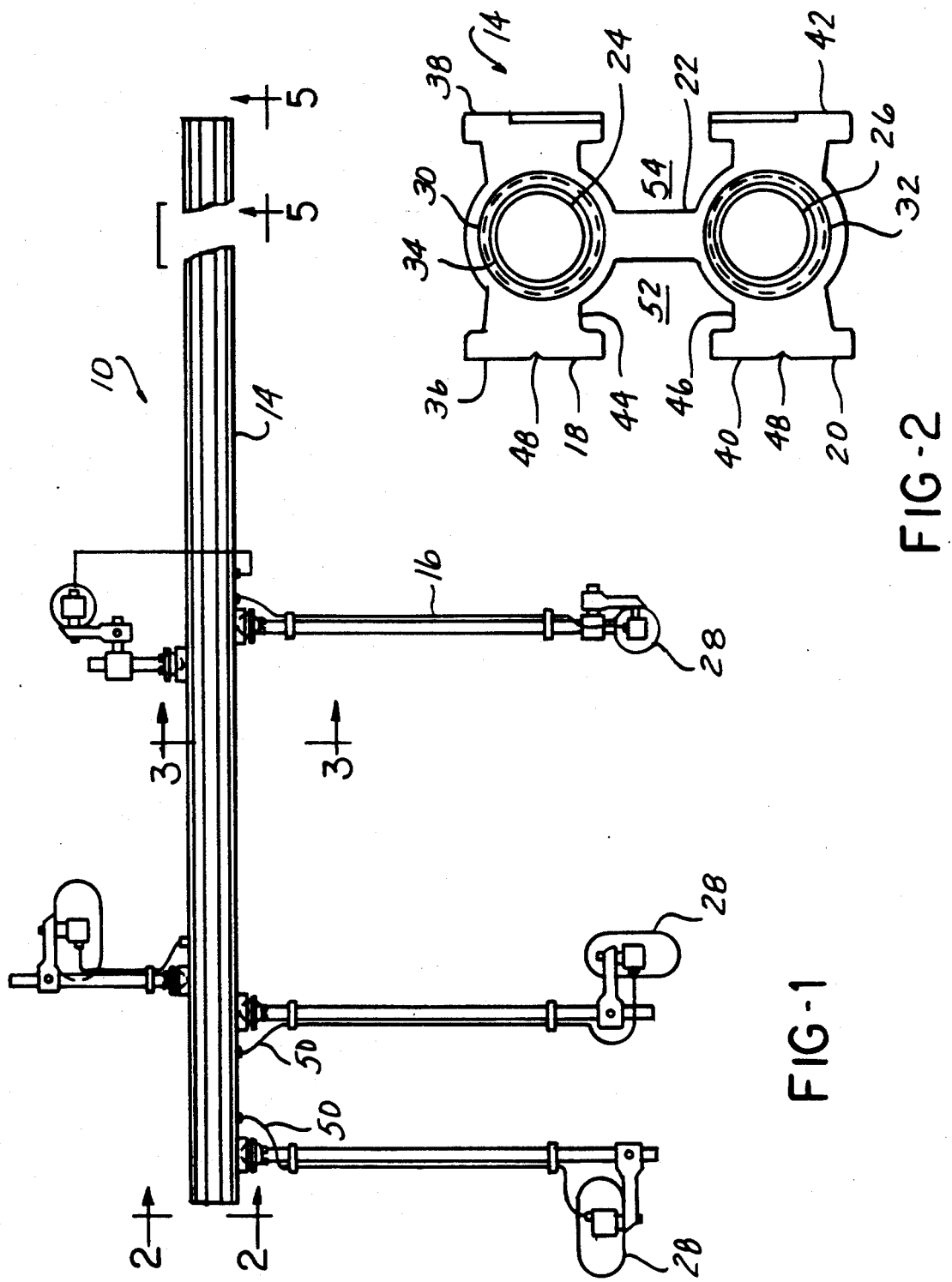

TRANSFER BOOM

BACKGROUND OF THE INVENTION

I. Field of the Invention

The present invention relates to a transfer boom. More particularly, the present invention relates to a transfer boom adapted for suspension from a reciprocal shuttle carriage.

II. Description of the Prior Art

An example of a transfer boom assembly is disclosed in U.S. Pat. No. 4,650,234 which discloses a transfer boom assembly having an elongated boom arm of circular cross section. A multiple hole pattern is extruded throughout the length of the boom to be used as air passages, thereby eliminating the need for pneumatic hoses.

These boom arms are mounted to the transfer boom assembly by a clamp positioned over and around the boom arm and fixedly attached thereto. The clamp provides sockets within which is mounted spreader bars. Spreader bars extend perpendicular to the boom arm and support Venturi vacuum cup assemblies. The vacuum cups engage and hold a workpiece to enable it to be carried to or removed from a work station. These vacuum cups are activated pneumatically and/or electrically, thereby requiring air or electric current to be fed to the vacuum cups via exposed hoses or electrical wires.

Although this previous transfer boom assembly provides interior air passages and protected passages for wires and hoses, the assembly itself is dense. The heaviness of the boom arm may cause it to sag during operation. The addition of multiple spreader bars extending from the boom arm creates an even heavier assembly and a greater chance of sagging or bending of the boom arm under the weight of the workpiece.

A further disadvantage of these previously known transfer boom assemblies is the clamping assembly used for mounting the spreader bars to the boom arm. These previously known clamping assemblies are bulky and awkward to handle. These clamps are of multiple piece assembly which may require constant readjustment as they are not permanently affixed to the boom arm. The clamp, along with the spreader bars, may rotate about the boom arm under the weight of the workpiece assembly.

SUMMARY OF THE INVENTION

The present invention provides a transfer boom which overcomes the disadvantages of the previously known transfer boom assemblies.

The present transfer boom replaces and eliminates the need for pneumatic hoses in the work area and provides complete concealment of any electrical wires. The boom is formed of a lightweight extrusion having an overall weight of at least 30 percent less than existing transfer boom assemblies.

The boom may be formed of several different shapes by extrusion methods. Each boom arm is provided with a plurality of interior passages extending the length of the boom arm. These interior passages define the air passages and eliminate the need for hoses. The boom arm may also be provided with exterior protective passages for wires and hoses. The various boom arm profiles are each extruded with a central opening extending the length of the boom arm. This opening eliminates the need for extra material in the boom arm structure thereby reducing the weight of the overall assembly.

A further advantage of this boom arm assembly is the clamping assembly provided for attaching a plurality of boom mounts to the exterior of the boom arm. A T-shaped cavity is provided within the exterior walls of the boom arm. In turn, a T-bolt is extended from the boom mount for mounting within the T-shaped cavity at any point along the boom arm. This mounting assembly facilitates quick mounting and demounting of the boom mount. Further, the T-shaped cavity extends the entire length of the boom arm thereby allowing the mounting of the boom mount at any location along the boom arm.

A further advantage of this transfer boom assembly is that the boom arm may be pretapped to the pressurized passage for air fittings feeding the vacuum Venturi cups. However, if the position of the air fittings is not readily determinable, scribed indentations may be extruded into the boom arm along the exterior of the boom arm to provide a means by which the user can locate, drill and tap holes at any points along the length of the boom. The scribed indentations are a marker to locate the interior pressurized passages.

A still further advantage of this transfer boom is that it comprises a quick disconnect coupling for easy mounting and demounting of the boom arm assembly from a reciprocal shuttle carriage.

Other advantages and features of the present invention will become more apparent from the following detailed description when read in conjunction with the accompanying drawing.

BRIEF DESCRIPTION OF THE DRAWING

The present invention will be more fully understood by reference to the following detailed description of the preferred embodiments of the present invention when read in conjunction with the accompanying drawing, in which like reference characters refer to like parts throughout the views, and in which:

FIG. 1 is a schematic plan view of an illustrative transfer boom assembly suspended from a reciprocal shuttle carriage;

FIG. 2 is a side view illustrating a preferred embodiment of the present invention;

DETAILED DESCRIPTION OF THE PREFERRED EMBODIMENTS

Figure 3:
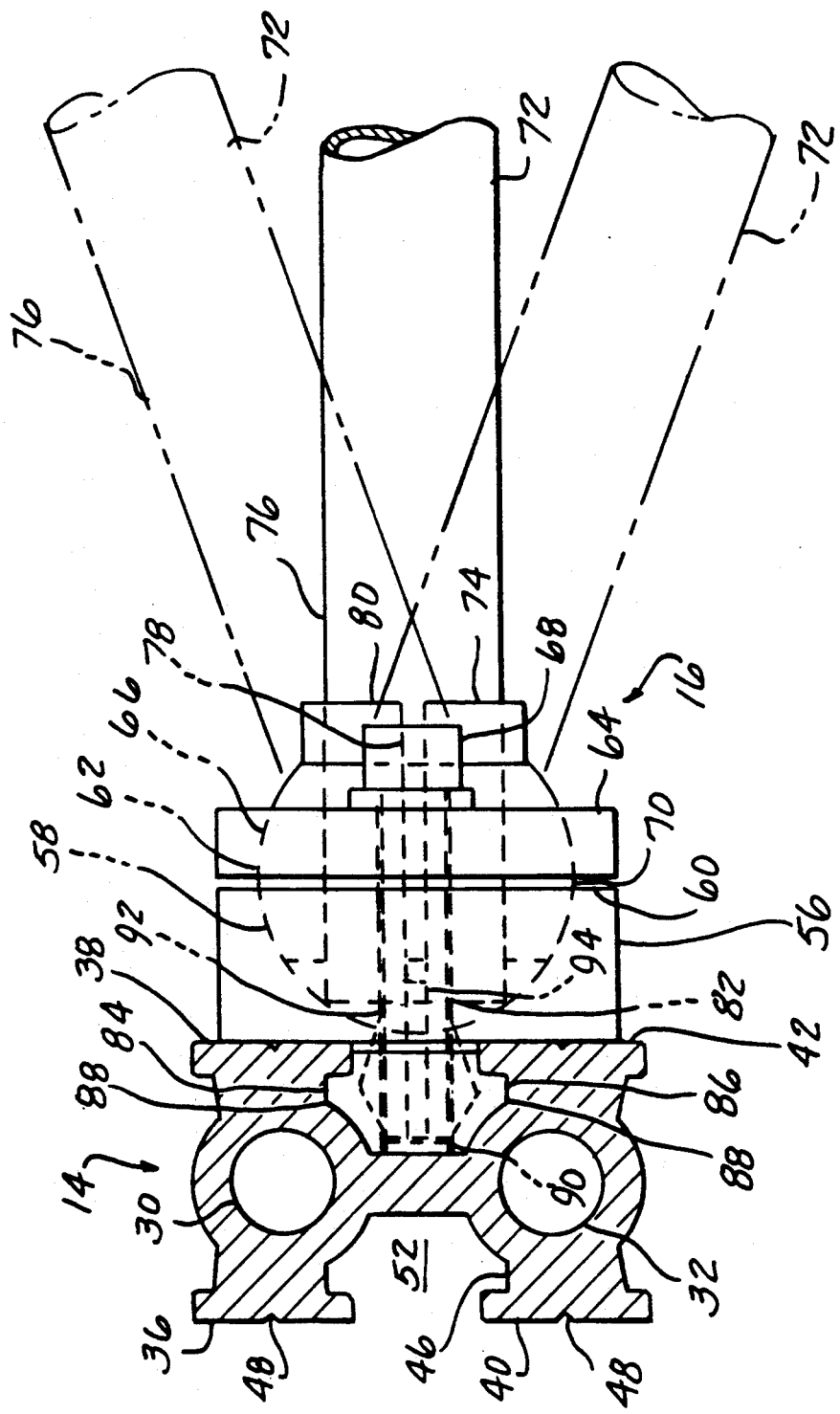
FIG. 3 is a cross sectional view taken along line 3—3 in FIG. 1 and enlarged for clarity.

With reference first to FIG. 1, a transfer boom assembly 10 is there shown for suspension from a reciprocal shuttle carriage A boom arm 14 extends from the reciprocal shuttle carriage and supports a plurality of boom mounts 16 extending perpendicular therefrom.

With reference now to FIG. 2, a side view of the preferred embodiment is there shown. The boom arm 14 has substantially an H-shaped cross section. Opposing parallel legs 18, 20 are supported by a central leg 22 extending between and perpendicular to opposing legs 18, 20.

Each opposing leg has an interior passage 24, 26 extending the length of the boom arm 14. These passages define the air passages for receipt of pressurized air for feeding to vacuum Venturi cups or grippers 28 as best shown in FIG. 1. The interior passages 24, 26 are shown to be previously tapped 30, 32. In use, one end of the boom arm 14 and its corresponding passages 24, 26 are attached to an air compressor or other source of pressurized air. The opposite end of the boom arm 14 and its corresponding passages 24, 26 is closed by a plug 34, for instance, to prevent the air from seeping out of the boom mount.

Each opposing parallel leg 18, 20 is also of substantially an H-shaped cross section, having flanges 36, 38, 40 and 42, extending outwardly from neck area 44, 46. The flanges 36, 38, 40 and 42 may be provided with a scribed indentation 48. The scribed indentations are extruded into the boom arm 14 and are located on the center line of and radially outward from the respective interior passage 24, 26. The scribed indentations 48 provide a means by which the user can locate, drill and tap a hole at any point along the length of the boom arm 14 for access to the pressurized interior passages 24, 26. This allows connection of air fittings 50 (FIG. 1) for feeding the vacuum Venturi cups or grippers 28 positioned at any location along the boom arm 14.

The overall cross section of the boom arm 14 forms a T-shaped cavity 52, 54 on opposing sides of the central leg 22. These cavities 52, 54 extend the entire length of the boom arm 14. The cavities 52, 54 are used to mount the boom mount 16 to the boom arm 14.

With reference now to FIG. 3, a boom mount 16 is there shown mounted to boom arm 14. The boom mount 16 is comprised of a base plate 56 which seats on flanges 36, 38, 40 and 42. A spherical aperture 58 is provided within the base plate 56 and opens up to the exterior of the plate 56 on side 60 away from the boom arm 14. A ball joint 62 is supported within this spherical aperture 58 for rotation therein. A second plate 64, having a spherical aperture 66 extending through the interior of the plate 64, secures the ball joint 62 and the base plate 56 to the boom arm 14 by bolts 68. The aperture 66 extends beyond the midway point 70 of the ball joint 62. This prevents the ball joint 62 from disengaging from the base plate 56 and still allows it to rotate within the base plate 56.

Spreader bars 72 in the form of tubing are slidably received within the ball joint 62. Sleeve 74 on the ball joint 62 frames the outer diameter 76 of the spreader bar. The sleeve 74 has an interior diameter slightly less than the outer diameter 76 of the spreader bar 72. The sleeve 74 is slotted at 78. This allows for the spreader bar 72 to be engaged by the ball joint 62 as the sleeve 74 may be spring biased to accommodate the outer diameter 76 by expanding the sleeve 74 at the slot area 78. The spring biasing of the sleeve 74 holds the spreader bar 72 in place within the ball joint 62.

Bolts 68 are of a T-shaped cross section. The bolts 68 are typical in that they have a head 80 and a shaft 82. The shaft 82 extends through second plate 64 and base plate 56 into the T-shaped cavity 52, 54. Flexible fingers 84, 86 extend within slots 88 on opposing sides of the shaft 82. The fingers 84, 86 are fixedly connected at one end to the end of the shaft at 90 and at the other end, the midsection of the shaft shown at 92. The interior of the shaft 82 is provided therewith with a screw member 94.

As the head of the bolt 80 is turned clockwise, the screw member 94 is forced downwardly towards the T-shaped cavity 52, 54. This downward force thrusts the fingers 84, 86 outwardly toward the neck areas 44, 46. As the bolt head 80 continues to turn, the fingers 84, 86 continue to spread to fill the T-shaped cavity 52, 54. The fingers 84, 86 are secured between the flanges 36, 38, 40 and 42 and the neck area 44, 46. The fingers prevent the boom mount 16 from being removed from the boom arm 14. To remove the boom mount 16 from the boom arm 14, the T-bolt 68 is simply rotated counter-clockwise thus relieving the stress on the fingers 84, 86. In this way, the boom mount can easily be mounted and demounted at any point within the T-shaped cavity 52, 54 on the boom arm 14.

Figure 4:
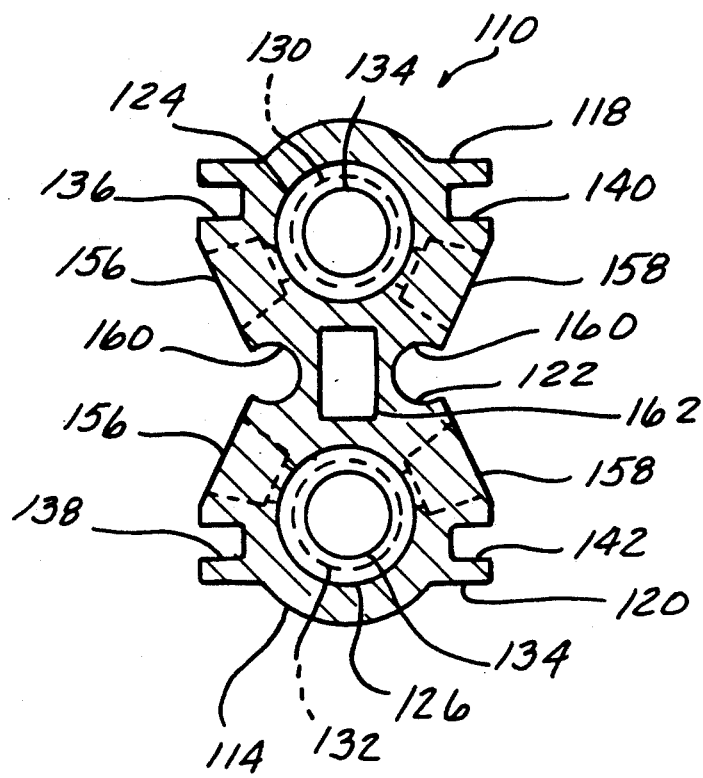
FIG. 4 is a side view illustrating a second preferred embodiment of the present invention.

With reference now to FIG. 4, a second preferred embodiment is there shown at 110. The boom arm 114 is formed of substantially an H-shaped cross section. Opposing parallel legs 118, 120 are joined by the central area 122 extending perpendicular between the parallel legs 118, 120.

Interior passages 124, 126 extend the length of the boom arm 14 and define the air passages for feeding pressurized air to the vacuum Venturi cups or grippers 28. These passages are tapped 130, 132 for receipt of air fittings. As described above, one end of the passages 124, 126 is connected to one or more air compressors or any other source of air while the opposite end is closed off by a plug 134.

Rather than having scribed indentations, pretapped holes 156, 158 are provided along the boom arm 114 for connection of air fittings 50 for feeding the vacuum Venturi cups or grippers 28. Flanges 136, 138, 140 and 142 are provided within legs 118, 120 for mounting of a boom mount 16. Protected passages 160 are also provided on either side of the central area 122. These passages 160 extend the length of the boom arm 114 and are used for wires and hoses, such as electrical wires. These passages 160 prevent the wires from falling about the work area.

A central aperture 162 is extruded along the interior of the boom arm 114 to reduce the overall weight of the boom arm 114.

Figure 5:
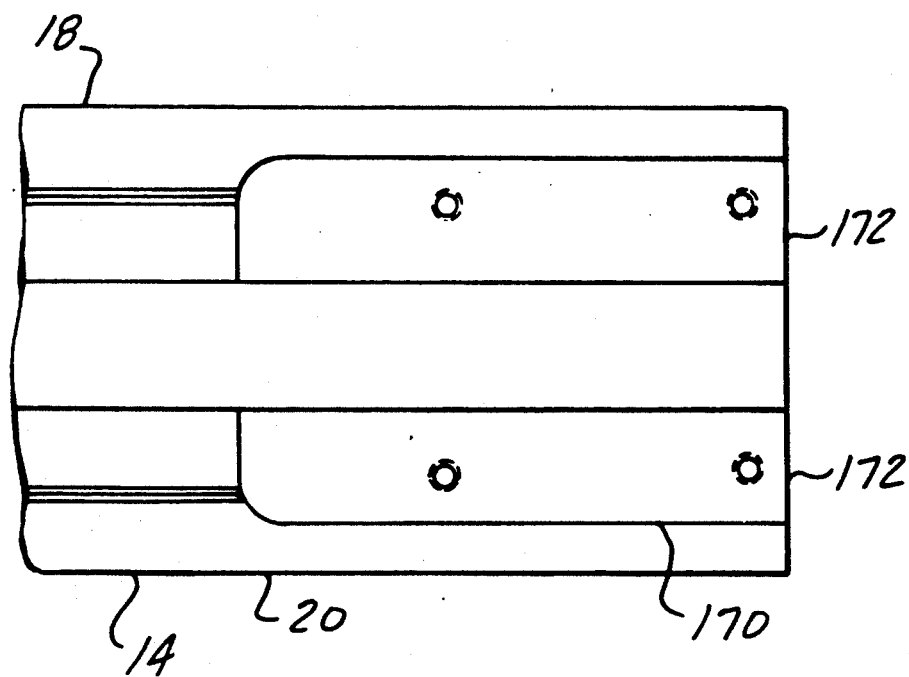
FIG. 5 is a cross section taken along line 5—5 of FIG. 1, enlarged for clarity.

With reference now to FIG. 5, a side view of the end of the boom arm 14 is there shown. The boom arm 14 is provided with a quick disconnect assembly 170 for mounting of the transfer boom assembly 10 to a reciprocal shuttle carriage (FIG. 1). The disclosure in Blatt, U.S. Pat. No. 4,898,287, and Blatt, U.S. Pat. No. 4,905,850, to the extent necessary for an understanding of the function and operation of the present quick disconnect assembly 170, is incorporated by reference herein. For the purpose of the present, disclosure, it is sufficient to understand that the boom arm 14 is mounted to a reciprocal shuttle carriage by means of a cam locking system. The cam engages the boom arm 14 within the machined slot 172 provided on opposing legs 18, 20.

In use, the boom arm 14 is mounted to a reciprocal shuttle carriage at the machined slot 172. Boom mount 16, supporting Venturi cups or grippers 28, is mounted to the boom arm 14 within the T-shaped cavity 52, 54. Since the T-shaped cavity 52, 54 extends the length of the boom arm 14, the boom mount 16 can be placed at any point along the boom arm 14. Spreader bar 72 is rotatable about the ball joint 62 for proper location of the Venturi cups or grippers 28.

Interior passages 24, 26 provide a means for pressurized air to travel along the boom arm 14. Pretapped holes 130, 132, 156, 158 (FIG. 4) or scribed indentations 48 (FIGS. 2 and 3) for locating and tapping holes are provided for seating air fittings 50. The air fittings 50, in turn, provide the pressurized air to the Venturi cups 28.

Protective passages 160 may be provided along the length of the boom arm, 114 to support any necessary electrical wiring.

Having described our invention, however, many modifications thereto will be come apparent to those skilled in the art to which it pertains without deviation from the spirit of the invention as defined by the scope of the appended claims.

We claim:

1. A transfer boom for suspension from a reciprocal shuttle carriage comprising:
   elongated boom arm means for supporting a work piece from said reciprocal shuttle carriage, said boom arm means having at least one longitudinally extending cavity disposed thereon;
   a plurality of boom mounts supportable from said boom arm means;
   mounting means for connecting said boom mounts to said boom arm means in cooperation with said at least one longitudinally extending cavity, said mounting means including a pivotal joint for allowing rotation in a plane normal to a longitudinal axis of said boom arm means, said mounting means further allowing movement of said boom mount longitudinally along said boom arm means; and
   means for releasably locking said mounting means to hold said boom mount to said boom arm means at a desired position.

2. The transfer boom of claim 1 wherein said at least one cavity comprises a cavity having a substantially T-shaped cross-section.

3. The transfer boom of claim 1 wherein said mounting means further comprises:
   a baseplate straddling said at least one cavity to contact said boom arm means on opposite sides of said cavity, said baseplate including a semi-hemispherical socket aperture disposed thereon;
   a ball connected to said boom mount for defining a ball and socket joint in cooperation with said semi-hemispherical aperature formed on said baseplate; and
   a ball retaining plate having an aperture larger than said mounting arm and smaller than an outer diameter of said ball, said ball retaining plate frictionally engageable with said ball through said locking means for locking said boom mount on said boom arm means.

4. The transfer boom of claim 1 wherein said locking means further comprises a bolt engageable at one end with said boom mount and at another end said bolt engageable within said at least one cavity in said boom arm means to secure said boom mount to said boom arm means.

5. The transfer boom of claim 1 further comprising said boom arm means having at least one interior passage extending longitudinally with respect to said boom arm means, said at least one passage being closed at one end and having air inlet fittings selectively connected to an opposite end.

6. The transfer boom of claim 1 further comprising at least one scribed line indentation along an outer surface area of said boom arm means for aiding in locating, drilling and mounting of pressure air inlets for communication with said at least one interior passage.

7. The transfer boom of claim 1 further comprising releasable mounting means for slidably attaching said boom arm means to said shuttle carriage.

8. The transfer boom of claim 1 wherein said boom arm means comprises an elongated boom arm having a substantially H-shaped cross-section defined by opposing legs and a central leg extending between and perpendicular to the opposing legs, each of the opposing legs having an interior passage extending the length of the boom arm, the opposing legs and central legs forming opposing substantially parallel cavities therebetween.

9. A transfer boom for suspension from a reciprocal shuttle carriage comprising:
   elongated boom arm means for supporting a workpiece from said reciprocal shuttle carriage, said boom arm means having at least one longitudinally extending cavity disposed thereon, said boom arm means including at least one integrally formed interior passage extending longitudinally along the boom arm means, said at least one passage being closed at one end and having air inlet fittings selectively connected to an opposite end;
   a plurality of boom mounts supportable from said boom arm means;
   mounting means for connecting said boom mounts to said boom arm means in cooperation with said at least one longitudinally extending cavity, said mounting means including a pivotal joint for allowing rotation in a plane normal to a longitudinal axis of said boom arm means, said mounting means further allowing movement of said boom mount longitudinally along said boom arm means, said mounting means including a baseplate straddling said at least one longitudinally extending cavity to contact said boom arm means on opposite sides of said at least one cavity, said baseplate having a semi-hemispherical socket aperture disposed thereon, a ball connected to said boom mount for defining a ball and socket joint in cooperation with said semi-hemispherical aperture formed on said baseplate, and a ball retaining plate having an aperture larger than the mounting arm and smaller than in outer diameter of the ball, the ball retaining plate frictionally engageable with the ball for locking the boom mount on the boom arm means; and
   means for releasably locking the mounting means to hold the boom mount to the boom arm means at a desired position.

10. The transfer boom of claim 9 further comprising a scribed line indentation along an outer surface of said boom arm means for aiding and locating, drilling and mounting of pressure air outlets for communication with said at least one interior passage.

11. The transfer boom of claim 9 wherein said at least one cavity comprises a cavity having a substantially T-shaped cross section.

12. The transfer boom of claim 9 wherein said locking means further comprises a bolt engageable at one end with said boom mount and at another end said bolt engageable within said at least one cavity in said boom arm means to secure said boom mount to said boom arm means.

13. The transfer boom of claim 9 further comprising releasable mounting means for slidably attaching said boom arm means to said shuttle carriage.

14. The transfer boom of claim 9 wherein said boom arm means comprises an elongated boom arm having a substantially H-shaped cross-section defined by opposing legs and a central leg extending between and perpendicular to the opposing legs, each of the opposing legs having an interior passage extending the length of the boom arm, the opposing legs and central legs forming opposing substantially parallel cavities therebetween.

* * * * *